July 8, 1941.                E. L. HARDER                 2,248,705
                         PILOT WIRE NEUTRALIZATION
                           Filed June 8, 1938                2 Sheets-Sheet 1
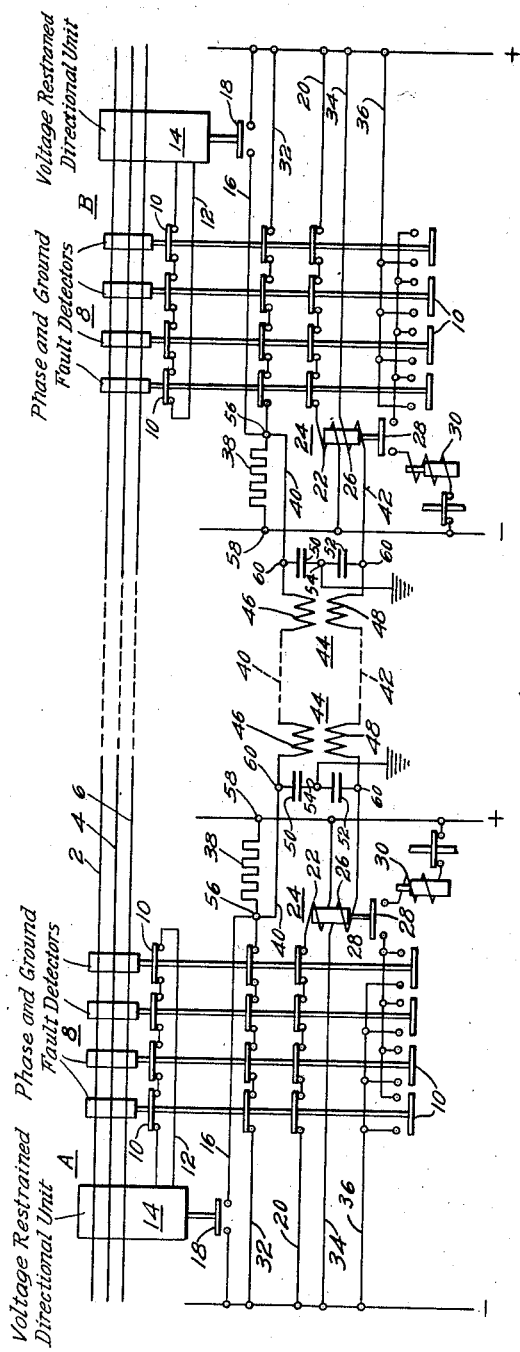
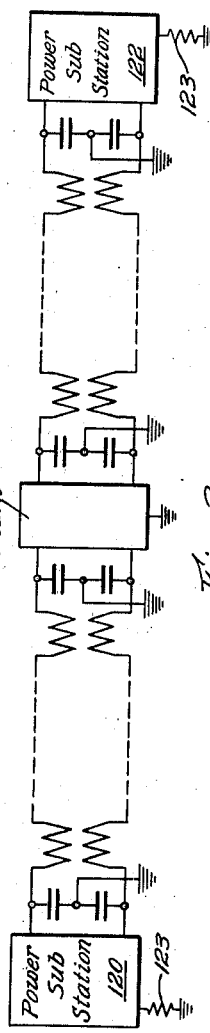
WITNESSES:
C. J. Weller.
Bernard L. Zangwill
INVENTOR
Edwin L. Harder.
BY O. B. Buchanan
ATTORNEY

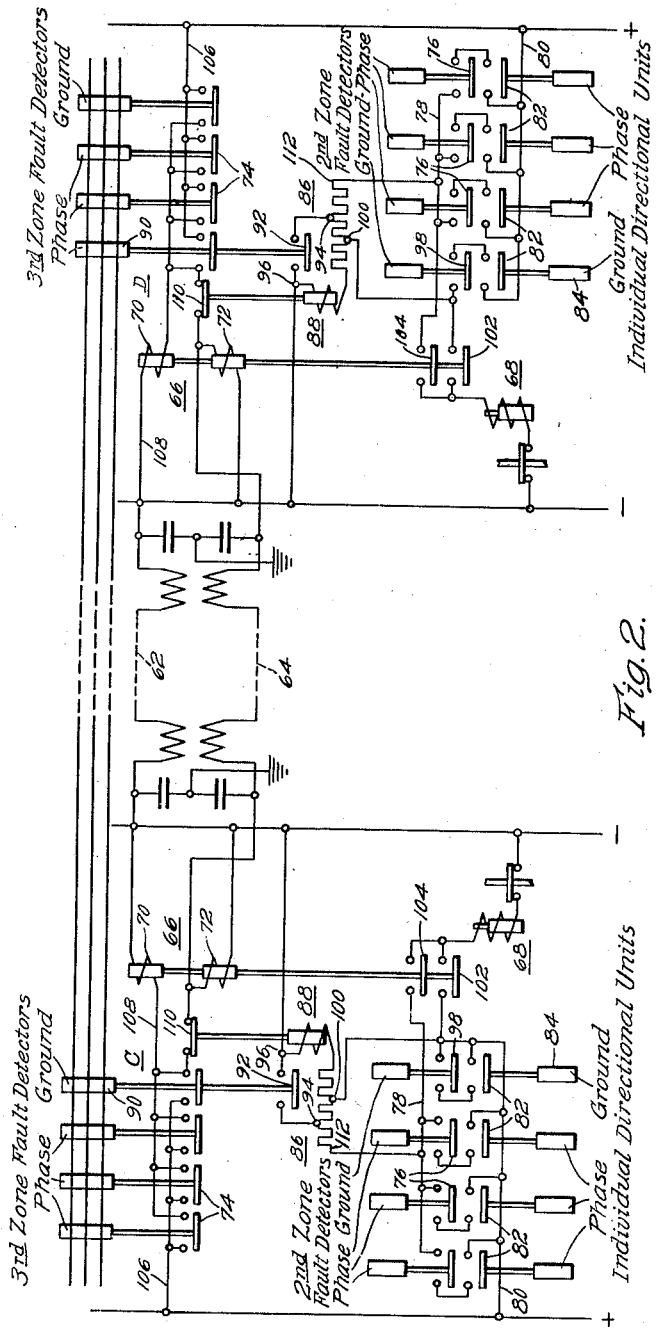

Patented July 8, 1941

2,248,705

UNITED STATES PATENT OFFICE 2,248,705

PILOT WIRE NEUTRALIZATION

Edwin L. Harder, Forest Hills, Pa., assignor to Westinghouse Electric & Manufacturing Company, East Pittsburgh, Pa., a corporation of Pennsylvania Application June 8, 1938, Serial No. 212,451

19 Claims. (Cl. 171—97)

In the use of pilot wire systems or other wire channels for protective control, metering, communication, and the like, precautions must be taken to prevent the undesired effects of ground potentials extraneously created in the wires as, for example, voltages induced in the wires from neighboring outside sources, such as power transmission circuits. In some instances, such voltages may be of such great value as to damage the terminal apparatus or the wires, or cause false operation of the protective equipment. A particularly obnoxious voltage may be created by a ground fault on a power line, which is accompanied by current in the ground return, and this current will induce a voltage in each of the pilot wires or channels. (For the sake of brevity, the terms "pilot wire" or "wires," are hereinafter referred to as generally indicating wired connections, and such terms are to be understood to include any wire channels of intercommunication.)

If the wires are close together, as is customary, the resultant voltage induced is practically the same in each wire as to its direction, value and location. This voltage is induced along the length of the wires, is usually termed "longitudinal" voltage, and does not appear as a voltage between corresponding points on the wires.

The art has developed certain means for lowering the longitudinal induced voltage in the pilot wires at the terminal equipment. One of these means involved a multi-winding neutralizing transformer which, for a two-wire system, comprised three closely coupled windings, one of which was connected in series in each of the pilot wires, the third winding being connected in series in an additional wire generally termed a "neutralizing" conductor. Such neutralizing transformers were disposed at various points along the pilot wire system or at each end of the pilot wire system, and the neutralizing conductor was juxtaposed and coextensive with the pilot wires. The third windings were connected at one end to the neutralizing conductor and were grounded at their other ends so that current induced in this neutralizing circuit had a complete path including a ground return of low impedance.

When a voltage is induced in each of the pilot wires, a corresponding voltage is induced in the neutralizing conductor, the completed grounded path of which permits current to flow therethrough. This current excites the neutralizing transformer and induces voltage in the other windings which are connected in the pilot wires. The construction and characteristics of the transformer are so chosen for a particular application that the voltages induced in the pilot wire transformer windings are nearly equal to and opposite to the voltages induced in the pilot wires by the external conditions so that the resultant or residual voltages manifested at the terminal or section ends of the pilot wires are limited to safe values.

The principal objection to this conventional arrangement for neutralizing the longitudinal voltage in the pilot wires is the requisite of an additional conductor coextensive with the pilot wires. In long pilot systems, the expense of this additional conductor is frequently prohibitive, and in my invention I provide a means for utilizing self-excited neutralizing transformers without the necessity of any wires in addition to that of the pilot system.

A second method for minimizing the effects of longitudinal induced voltage utilized grounded protective gaps which broke down when the induced voltage was of sufficient value. Inasmuch as pilot wire systems are usually operated with potentials in the neighborhood of 100 volts, while induced voltages are not infrequently approximately a total of 2000 volts, this method offers some degree of protection. However, this type of protection renders the pilot wire system inoperative during the periods of induction, which are frequently the periods in which it is essential to have the pilot wires capable of transmitting intelligence, especially so in protective systems.

An additional object of my invention is to provide a protective means which will not render the pilot system inoperable during periods of induction of voltages therein.

Still another means for minimizing the effects of longitudinal induction utilized so-called drains connected from each wire to ground. These drains generally take the form of a resistance or combination of impedances which is applicable to both alternating-current and direct-current pilot systems. These resistances or impedances drain the currents produced by the induced voltages to ground, but have the serious objection that when of a value to be really effective, they also drain or by-pass the signal current as well.

A further object of my invention is to provide a system utilizing improved means which will not appreciably drain or by-pass the signal current, but which will nevertheless effectively limit the manifestations of the induced voltages appearing at the terminals of a pilot-wire channel.

Other means are known seeking to reduce the effects of the extraneous voltages, and in alternating-current systems the so-called insulating transformer has certain marked advantages. This means has the serious objection in that it is inapplicable to direct-current systems.

It is accordingly a further object of my invention to provide a system capable of minimizing the effects of a longitudinally induced voltage which is applicable to both direct-current and alternating-current pilot systems.

I achieve the above and other objects of my invention by inserting a neutralizing transformer in the pilot wire systems having as many windings as there are pilot wires. One winding is inserted in each of the pilot wires, and at the terminal end I connect a high impedance drain to ground. In this manner I cause the induced longitudinal voltage to be absorbed in the neutralizing transformer. However, the neutralizing transformer has very low impedance to signal current, and the high-impedance drain does not appreciably drain or by-pass the signal current, so that very little effect is apparent on the normal operation of a pilot wire system employing my invention.

My invention is further applicable for neutralizing different ground potentials of two separated terminals of a pilot wire system. For example, two substations may have a pilot system which embraces lines leased from a telephone company where the substation is grounded through a small impedance and the telephone exchange is perfectly grounded. Any appreciable ground fault current in the power system will naturally flow through the impedance at the substation, raising the potential of the substation and thereby raising the potential of that terminal of the pilot wire system. However, a telephone plant is generally at absolute ground potential, and it is, therefore, necessary to neutralize the effect of grounded currents tending to flow in the same direction through the pilot wires from the ground at the substation to the ground at the telephone plant, or vice versa.

Other specific objects, applications and novel features of my invention will be apparent from the following description taken in conjunction with the accompanying schematic wiring diagrams, in which:

Figure 1 shows a differential protective system of a known type having the terminal apparatus interconnected by pilot wires and employing my neutralizing scheme;

Fig. 2 shows a modification embracing another type of a differential protective system embodying my neutralizing scheme;

Fig. 3 shows the application of my invention to a system in which there are different relative ground potentials at the terminals of a pilot wire system;

Fig. 4 shows a modification of my neutralizing means in which a balance-coil is added in the grounding circuit; and Fig. 5 shows a novel refinement applied to my neutralizing means.

Referring more especially to Figure 1, I have shown multiphase feeders 2, 4 and 6 in which the broken lines are inserted to indicate that these feeders may be of extensive length. The section between the terminals A and B of the feeders is protected by a differential pilot wire system having terminal apparatus at each of these points interconnected by pilot wires. Each terminal apparatus comprises phase and ground fault detectors symbolically indicated by 8. These detectors are coupled to the multiphase feeders in any well known conventional manner and each serves to operate a contactor 10 of groups of contactors upon the occurrence of a phase or ground fault as is well known in the art.

A first group of series-connected contactors comprises a circuit 12 for controlling the voltage restraint winding of a directional unit 14 in a common way. A second group of series-connected contactors can be shorted by a circuit 16 controlled by the contactor 18 of the voltage restrained directional unit 14. A third group of series-connected contactors is included in another circuit 20 and controls one of the holding coils 22 of a relay 24.

The relay 24 comprises two holding coils 22 and 26 operating upon a contactor 28. Under normal conditions of balanced flow of current in the feeders between the terminals A and B, the contactor 28 is maintained in its front position so that trip coil 30 is deenergized and the circuit breaker (not shown) controlled by the trip coil maintains the feeder section connected.

Batteries indicated by the plus and minus signs of Fig. 1 supply power to the terminal protective apparatus.

A circuit 32 includes the second group of contactors which can be shorted by the circuit 16, and it also includes a resistance 38 leading to the positive pole of the source of supply. A pilot wire 40 extends between corresponding points of the terminal apparatus which, as shown, are at the respective junctions of the resistance 38 and the second group of contactors.

A circuit 34 extends from the negative terminal of the source of power at one terminal apparatus through the holding coil 26 of the relay 24 thereat, and by means of a pilot wire 42 is connected to the corresponding parts of the other terminal apparatus.

A circuit 36 includes the fourth group of movable contactors 10, all connected in parallel and then in series with the contacts controlled by the contactor 28, and in series with the trip coil 30. The circuits 12, 20 and 36 are local circuits, while the circuits 32 and 34 at both terminal apparatuses are interconnected by means of the pilot wires 40 and 42.

In order to protect the terminal apparatus from voltages that might be extraneously induced in the pilot wires, in accordance with my invention I insert near each terminal end a neutralizing transformer 44 having windings 46 and 48 in the pilot wires 40 and 42, respectively. At the far end of each of the pilot wires, that is, the end nearest to the terminal or the end farthest from the center of the wires, I connect capacitors 50 and 52 in series across the pilot wires with their junction point 54 grounded.

In operation, the pilot wires are used to prevent tripping by the trip coils 30. Normally, that is, with normal balanced currents in the feeder section, the fault detectors are deenergized and the circuit 20 maintains the holding coil 22 energized so that the circuit 36 is open at the contactor 28 as well as at the fourth group of movable contactors 10. No current flows in the pilot wires inasmuch as their ends are shorted from the points 56 through the second group of the contactors 10 in the circuit 32.

When voltage is impressed on the pilot wires on either or both ends, the holding coil 26 at each of the terminal receiving units at A and B is energized. Thus, if it is assumed that one or more of the fault detectors at terminal A only operate, this condition removes the short about the pilot wires, permitting current to flow from the positive pole of the battery at A at point 58, through the resistance 38 of the terminal apparatus A, through the pilot wire 40 to the point 56 of the terminal apparatus B. From this point the current passes through the closed contactors of the circuit 32 at B, through the circuit 34 thereat, through a holding coil 26 of terminal apparatus B, and thence to the pilot wire 42. The pilot wire 42 at terminal A connects to the holding coil 26 and the circuit is completed to the negative pole of the battery. If fault detectors at both terminals A and B operate, a circuit may be traced which also includes both holding coils 26, both batteries and both resistances 38.

When the fault is internal of the feeder section, the directional unit 14 at one or both of the terminals will operate to restore the shorting circuit 16 across the pilot wires and thereby deenergize the holding coil 26 at the corresponding terminal. Inasmuch as the holding coil 22 is also deenergized by operation of a fault detector by means of the third group of contactors in the circuit 20, the contactor 28 will close and the trip coil 30 will be energized for the reason that the circuit 36 is completed at one or more of the fourth group of contactors in the circuit 36 by virtue of the aforesaid operation of a fault detector.

If the pilot wire signalling current is low frequency alternating current or pulsing direct current as is frequently the case for the transmission of signal intelligence, particularly on supervisory circuits, the neutralizing transformers, offer little impedance to the flow of the signalling current. The windings 46 and 48 of the neutralizing transformer are closely coupled, as is usual in such transformers, and inasmuch as the signal currents in the pilot wires 40 and 42 are in opposite directions, the mutual impedances of the windings tend to lower the effective impedance of each of the windings to the flow of pilot wire signal current. Of course, where direct current only is involved, then the impedance of the neutralizing transformers to signal current is determined only by the resistance of the transformers, in which case the capacitors 50 and 52 not only provide a path for the magnetizing or self-exciting currents of the neutralizing transformers 44 in the presence of the extraneously induced in-phase or longitudinal voltages, as will subsequently be described, but said capacitors 50 and 52 also block the direct current from ground.

The mathematical analysis of the operation of the neutralizing system comprising the transformer 44, capacitors 50 and 52 and the ground connection 54 is as follows: Let $Z$ be the self-impedance of each of the windings of the transformers; let $M$ be the mutual impedance between these windings; and $z$ be the impedance of a capacitor 50 or 52, both of which are assumed to be the same. All quantities are vectorial. The impedance $Z$ of the neutralizing transformer 44 is chosen deliberately so high that the pilot wire impedance may be deemed negligible as compared thereto. This is another way of saying that the neutralizing transformer 44 is capable of developing a relatively high in-phase voltage, upon the flow of a relatively small longitudinal or in-phase exciting-current, by "in-phase" meaning that the voltages or currents in the two pilot wires are in phase with each other.

If now a longitudinal induced voltage equal to $E$ is induced in both of the pilot wires, a current $I$ will flow in each wire through ground return which is determined by the equation:

$$E - 2IZ - 2IM - 2Iz = 0 \quad\quad (1)$$

Solving for $I$, the equation is obtained:

$$I = \frac{E}{2(Z + M + z)} \quad\quad (2)$$

The remnant voltage $e$, that is, twice the voltages across a capacitor 50 or 52, will be the difference between the induced voltage and the transformer-voltage of the neutralizing transformers 44 due to the longitudinally flowing exciting or magnetizing transformer current flowing through the pilot wire and the grounding capacitors 50 or 52, and is:

$$e = E - 2IZ - 2IM = E\left(1 - \frac{Z + M}{Z + M + z}\right) \quad\quad (3)$$

It may be observed that half of this remnant voltage appears between the parts at the terminal apparatus and ground since this value is present between points 60 and ground, and is superposed on any wire to wire signal voltages that may be present.

In a neutralizing transformer $Z$ and $M$ are substantially equal so that Equation 3 becomes $$e = E \frac{z}{z + 2Z} \quad\quad (4)$$

If, therefore, the fraction $$\frac{z}{z + 2Z}$$

is made small, the remnant voltage is correspondingly small and any induced voltage will be effectively neutralized. For a specific example, if it is assumed that a fault on a 25-cycle power system induces a voltage of 2000 volts in the pilot wires, that $Z = 35,000$ ohms inductive, and $z = 6,300$ ohms capacitive, the remnant voltage will be but 198 volts, only one-half of which, or 99 volts, appears across each capacitor 50 or 52. These values apply to a capacitor 50 or 52 of 1 microfarad, which is a small capacitor, having a high impedance in the range of expectable frequencies of the longitudinal induced voltages, and a neutralizing transformer 44 which is capable of developing 2000+198 or 2198 volts with an exciting current or magnetizing-current, from Equation 2, of $$I = \frac{2000}{2(35,000 + 35,000 - 6300)} = .0157 \text{ amperes}$$

or approximately 16 milliamperes, which is a small exciting-current. The small, 1-microfarad grounding-capacitors 50 and 52 thus not only provide a path to ground, which makes possible the flow of sufficient longitudinally flowing, or in-phase, currents $I$ to excite or magnetize the transformers 44, while holding the extraneously induced voltage to 99 volts at each terminal of the pilot wires, but at the same time these small grounding-capacitors provide only a high-impedance drainage-circuit of twice 6,300 or 12,600 ohms, shunted across each end of the pilot wire, so that they drain off only a small amount of the useful signal-currents or signal-voltages from the pilot wires.

The following table indicates approximately the ratio of the induced voltage to the remnant voltage for neutralizing transformers having windings with self-impedances of 24,000 ohms at 25 cycles and capacitors in one instance of one-half microfarad and in another instance of one microfarad:

$$\frac{E}{e}$$

for $Z=24{,}000$ ohms at 25 cycles

| Frequency | $C=\tfrac{1}{2}$ m. f. | $C=1$ m. f. |
|---|---|---|
| 20 | 1.4 | 3.9 |
| 25 | 2.8 | 6.5 |
| 30 | 4.4 | 9.9 |
| 45 | 11 | 23 |
| 50 | 14 | 29 |
| 55 | 17 | 36 |
| 60 | 21 | 42 |
| 65 | 25 | 51 |

It may be observed that the effectiveness of the neutralizing system increases as the frequency of the induced voltage increases. Moreover, it may be observed that for a relatively large range from a given frequency the neutralizing system has a substantially constant characteristic; that is to say, a difference of a few cycles one way or the other does not change its neutralizing and drainage effect to any practical disadvantage or objectionable degree. From the above table it is obvious that for an expectable induced voltage having a frequency in the neighborhood of 20 cycles, it would be preferable to use the larger capacitor, or a neutralizing transformer of higher impedance, so that $E/e$ will have a ratio of at least 2 for practical purposes.

In Fig. 2 I show my system applied to another type of well-known differential protective system in which the pilot wires 62 and 64 connect terminal apparatuses C and D. The protective system is of the so-called zone type. At each terminal a relay 66, controlling a tripping coil 68, comprises an operating winding 70 and a restraining winding 72, which is stronger than the operating winding. The third zone phase and fault detectors have contactors 74 connected in parallel. The second zone phase and fault detectors also have contactors 76 connecting conductors 78 and 80 in parallel branches. Each branch includes one of the contactors 76 in series with a contactor 82 of individual-phase power-directional elements 84, with maximum torque for volt-amperes at a particular phase angle.

The conductor 78 connects to a resistor 86 which in turn is connected to a relay 88. The circuit then is completed to the other pole of a battery as shown. I include this resistance 86 for the purpose of obtaining a ground preference operation so that where simultaneous internal phase and ground faults occur, the ground fault will prevail. To accomplish this, the third zone ground detector 90 has a second contactor 92 controlling a circuit from an intermediate point 94 of the resistor 86 to the end terminal 96 of the relay 88. The second zone ground fault detector has its contactor 98 controlling a circuit connected to the intermediate point 100 of the resistance 86. This contactor 98 also controls a circuit through a contactor 102 of the relay 66, and the trip coil 68. The wire 78 also extends to one contact of a pair of contacts controlled by the contactor 104 of the relay 66, the other contact of which is also part of the circuit including the trip coil 68.

When one or more of the parallel contactors 74 of the phase fault detectors close, a circuit is completed between wires 106 and 108. The wire 108 leads to the operating coil 70, the other end of the coil being connected to the negative pole of the terminal battery, which in turn is connected to the pilot wire 62. The wire 108 also connects to the restraining coil 72 through a normal closed contactor 110 of the relay 88.

During normal conditions, that is, balanced flow through the feeder section, both windings 70 and 72 are de-energized so that the circuit to the trip coil 68 is opened at the contactors 102 and 104. If the third zone phase fault detectors operate, a circuit is completed from the plus pole of the battery at C, through one of the contactors 74, through the operating coil 70 at C, to the negative pole. A second circuit is completed through the contactor 110, through the restraining windings 72 at both terminals, to the negative pole. Inasmuch as the restraining coil is made stronger than the operating coil, the contactors 102 and 104 do not immediately operate although the circuit controlled by them has been partially closed by the second zone phase fault detectors at the contactors 76. However, upon operation of the directional element due to an internal fault on the feeder section, a contactor 82 completes the circuit through the relay 88, which opens the circuit through the restraining winding 72 at C, thereby permitting the trip coil circuit to be closed by the energized operating winding 70. In this way the system is responsive to an internal fault operating the directional unit.

Upon the occurrence of an internal ground fault only, very much the same sequence of operations occurs at the terminal apparatus. However, it may be observed that the second zone ground contactor 98 prepares a circuit to the relay 88 through a part only of the resistance 86, while the third zone ground fault detector contactor 92 substantially shunts the wire 78 around the relay 88.

If both phase and ground faults occur, the ground fault is given preference inasmuch as the second zone phase fault detectors and their contactors 76 complete circuits to the end 112 of the resistance 86, the point 94 of which is connected through the circuit involving contactor 92 which now bypasses the relay 88. However, the circuit of the contactor 98 will energize the relay 88 so that a comparison of ground faults only is necessary at the two terminals.

The neutralizing system for the embodiment of Fig. 2 is exactly the same as that shown for Fig. 1, and by choosing the proper constants I can limit the remnant voltage of the induced voltage which will occur on the terminal apparatus to any desired fraction as shown, for example, by the table.

In Fig. 3 I show wherein my system is applicable for the neutralization of different ground potentials. In pilot wire systems it is not unusual to lease or use telephone lines which extend between the desired points. Thus, in Fig. 3, the substations 120 and 122 may have feeders between them, which it is desired to protect by a differential pilot wire system, or may have a supervisory pilot wire system to enable control of one station by the other or communication between them.

The pilot wires from substation 120 may be telephone wires leading to a telephone exchange or plant. From this plant a second group of pilot wires extends to the substation 122. Grounds at substations are universally imperfect and have a very small resistance or impedance symbolized in Fig. 3 by reference numeral 123. In this event, the ground potential of the substation will be above absolute ground, and this value will be accentuated if heavy fault currents flow through the impedance ground connection. On the other hand, telephone plants are invariably perfectly grounded and the small telephone currents do not cause appreciable voltage drop in the ground impedance. Some provision must, therefore, be made to prevent circulating ground currents due to the difference of ground potentials at the telephone exchange and substations from damaging or falsely operating the pilot system. My novel system is ideally adapted for the purpose, and Fig. 3 shows the adaptation thereof.

It may be observed that at each of the ends of the pilot wires the neutralizing transformers and the small grounding-capacitors are connected as is shown in Figs. 1 and 2, so that the effect of the longitudinal voltage due to the difference of ground potentials is nullified in the same manner. Thus my invention not only protects against voltages induced on the pilot wires but also against differences in potentials to ground of the respective terminal apparatus.

In Fig. 4 I show a modification of my neutralizing system for application to pilot wires wherein the communication signals are of an appreciable frequency as, for example, audio-frequency. In this special case, it may be desirable to provide balance coil impedances 126 grounded preferably at their center points, and inserted between the small capacitors of the prior embodiments. These impedances 126 take the form of inductances and prevent by-pass of audio-frequencies across the points 128 and 130. However, because of the mutual impedance between the halves of the coils 126, very little impedance is offered to the drainage of the extraneous currents due to induced longitudinal voltage. The balance-coils 126 are used, in this special case, because a grounding-capacitor of 1 microfarad, or ½ microfarad, or any other size, has a 5000-cycle impedance which is only one two-hundredth of its impedance at 25 cycles. Consequently, the useful audio-frequency signal-current might be shunted to an extent which might perhaps be quite appreciable, at audio-frequencies ranging up to, say 5000 cycles. The use of similar balance coils, for making the ground connection, has been known heretofore, but in connection with much larger grounding-capacitors, as shown in Patent No. 1,728,534, granted September 17, 1929, to C. Le G. Fortescue, and assigned to the Westinghouse Electric & Manufacturing Company.

In Fig. 5 I show a further improvement on the neutralizing embodiments thus far disclosed. The neutralizing transformer 150 and a pair of capacitors 152 are located at the points where the induced voltages are to be neutralized. One pilot wire channel comprises wires 154 and 156 and the other comprises wires 158 and 160. The wires 156 and 160 may be deemed the terminal side of the pilot wires and do not connect to the terminals of the transformer windings as in the previous embodiments but to intermediate points which are at substantially ground potential, and, therefor, a substantially zero remnant voltage results. This readily obtains inasmuch as the voltage across a capacitor 152 is in phase opposition to the voltage of a winding of the neutralizing transformer, and at some point on the winding the vector sum of the voltage across the capacitor and the adjacent fractional winding is substantially that of ground.

It is understood that the undesired voltages are neutralized primarily in the neutralizing transformers, and the capacitors complete the path for the self-exciting or magnetizing current necessary to cause the neutralizing transformers to oppose the undesired longitudinal voltages which are induced in the pilot wires.

There are many manifest advantages of my system over prior systems. The amount of shunt capacity at each drain point can be controlled by making the capacitors, relatively small so that they provide a relatively large shunting impedance across the pilot wires, while having a relatively small impedance as compared to the impedance of the neutralizing transformers.

In my system, whatever value of capacitor is chosen it has effectiveness for an appreciable range of variation of frequencies of the induced voltage. For short duration high frequency transients, the effectiveness of my system is considerably increased since, as shown by the table, the higher the frequency the more effectively the induced voltage is neutralized in the neutralizing transformers, and the smaller is the accompanying voltage-drop which appears across the grounding-capacitors when they conduct the transformer-exciting or magnetizing current to ground.

The effectiveness of my system changes only slightly with relatively wide frequency changes which may occur during power system trouble. If such trouble occurs, voltages are induced in the pilot wires which may be somewhat off the natural frequency of the power system for short periods. Because of the characteristic of my protective devices, the effectiveness does not change appreciably in spite of the slight variations in the frequency of the power sources.

In my system, the high impedance offered to the induced currents by the neutralizing transformer and grounding-capacitors permits only very small induced currents to flow, so that little heating of the pilot wires obtains.

In my system, the neutralizing transformers and capacitors have voltages across them which are less than or not materially greater than the value of the induced voltage, and, therefore, need not be insulated for exceptionally high voltages. Moreover, the induced voltage is substantially absorbed before it reaches the terminal apparatus.

Many other advantages are present in my system and while I have illustrated my invention in the several forms which I now believe to be the best modes of application thereof, it is obvious that many changes may be made within the scope and spirit of the novel system which I have introduced, and other forms which may be preferred in some instances are illustrated and claimed in my copending application, Serial No. 393,184, filed May 13, 1941, and entitled "Pilot wire systems with means for neutralizing induced voltages." It is desired, therefore, that the appended claims be given the broadest construction consistent with their language and limited only by the appended claims.

I claim as my invention:

1. In a system of the type described, a pilot wire system, and means, cooperating therewith, for reducing the effects of extraneously-produced in-phase voltages in said wire system, comprising impedances for each wire of said wire system for substantially neutralizing said voltages, each said impedances having series leading and lagging back-voltages, due to induced current-flow to ground, and said wire system having terminal apparatus connected to intermediate points of said impedances at which the sum of leading and lagging voltages approaches ground potential.

2. A system comprising a pair of pilot wires of extended length interconnecting a plurality of stations forming therewith a complete wired circuit, means for reducing the effect of extraneous induced voltages in said pilot wires, which comprises spaced transformers, each having a pair of closely coupled windings, one in each of said wires, the impedance of each winding being considerably in excess of that of the wire in which it is connected, a pair of capacitors across said wires at each of said transformers, and a connection from ground to an intermediate connection point between said capacitors, each of said capacitors being of considerably less impedance than the said windings but not substantially tuned therewith at the frequencies expected to be extraneously induced or transmitted on said pilot wires.

3. A pilot wire system comprising two wires and stations connected thereby so that a signalling current flows in opposite directions in said wires, but subject to extraneously induced voltages in the same direction in said wires, means to neutralize said voltages before reaching said stations, said means comprising closely coupled windings, one in each of said wires, a circuit including serially-connected capacitors between said wires in proximity to said windings at a station side, and a ground connection to a point intermediate said capacitor, the constants of the parts being such that the fraction $$\frac{z}{z+Z+M}$$

is small, where Z is the self-impedance of each winding, M the mutual impedance between them, and z the impedance along the last said circuit between a pilot wire and ground, and where z is considerably smaller than $Z+M$.

4. The system of claim 3 wherein Z and M are substantially equal.

5. A neutralizing system for pilot wires comprising a neutralizing transformer at each end of said wires, said transformers having coupled windings, one in each of said wires; and an impedance connected at the far end of each of said wires and to ground, said windings each having an inductive impedance of Z value and a mutual impedance of M value to undesired currents in the same direction over said pilot wires, and each of said grounding impedances having a value of z, due to capacitance, the sum of Z and z being large compared to the impedance of the pilot wires, and Z and M being approximately equal and greater than z.

6. A pilot wire system including terminals, pilot wires connecting one terminal to another, means for reducing the effect of longitudinal voltages extraneously produced in said wires, comprising an inductive impedance in each of said wires offering substantially lumped high impedance to current-flow caused by said longitudinal voltages whereby large voltage drops are produced therein, said impedances in the wires being coupled to reduce the impedance to desired signal currents in said pilot wires, and to increase the effect of said inductive impedances to in-phase current-flow, and a capacitive grounding impedance between each end of at least one of said wires and ground, the sum of said capacitive grounding impedances having a numerical value smaller than that of the last said inductive impedance in a range of frequencies from about 20 to 65 cycles.

7. A pilot wire system including terminals, pilot wires connecting one terminal to another, and means for reducing the effect of parallel extraneously induced voltages in the pilot wires, said means comprising a series self-inductive impedance in each wire, the said impedances being coupled to provide mutual inductive impedance between wires, and a grounding impedance from each end of said wires to ground, said impedances being so related to each other that the induced voltage on any one of said wires, compared to the remnant voltage across the said grounding impedances which are connected to said one wire, is in the order of two or more, on a 20 cycle base, the said impedances being relatively high, with the sum of the said inductive impedances for each wire being higher than its grounding impedance.

8. The system of claim 7 wherein said grounding impedances are capacitive, and smaller numerically than at least one of the said inductive impedances.

9. A double-wire signaling pilot-wire channel that may be subject to extraneously produced parallelly-directed longitudinal voltages, in combination with a neutralizing transformer having two mutually coupled windings connected in the respective pilot wires, and means including relatively small grounding-capacitors connecting the respective pilot wires to ground at the respective ends of the pilot wires.

10. A double-wire signaling pilot-wire channel that may be subject to extraneously produced parallelly-directed longitudinal voltages, in combination with a neutralizing transformer having two mutually coupled windings connected in the respective pilot wires, and means including relatively high impedances connecting the respective pilot wires to ground at the respective ends of the pilot wires.

11. A double-wire pilot-wire channel, in combination with a neutralizing transformer having two mutually coupled windings connected in the respective pilot wires, and means including relatively small grounding-capacitors connecting the respective pilot wires to ground at the respective ends of the pilot wires, in which the effective impedance to in-phase currents in the transformer windings is considerably greater than the impedance of the grounding-capacitor to ground in the range of frequencies from about 20 to 65 cycles.

12. A double-wire pilot-wire channel, in combination with a plurality of spaced neutralizing transformers, each having two mutually coupled windings connected in the respective pilot wires, and means including relatively small grounding-capacitors connecting the respective pilot wires to ground at the respective ends of the pilot wires for providing a ground-return path for a magnetizing current for said neutralizing transformers.

13. A double-wire pilot-wire channel, in combination with a neutralizing transformer having two mutually coupled windings connected in the respective pilot wires, and means including relatively small grounding- capacitors connecting the respective pilot wires to ground at both sides of said neutralizing transformer for providing a ground-return path for a magnetizing current for said neutralizing transformer, the in-phase impedances of said windings and grounding-capacitors being such that said magnetizing current is of relatively small magnitude but sufficient to excite said neutralizing transformer.

14. A pilot wire system including terminals, pilot wires between terminals, said terminals including means for transmitting signal currents over said wires, means for reducing the effect of parallel voltages extraneously induced in said wires, comprising a neutralizing transformer having a plurality of windings, one connected in each of said wires, means including circuits to ground substantially at the terminal ends of said system, for providing a ground-return path for a magnetizing current for said neutralizing transformer, said circuits having a relatively low impedance compared to that of said windings to in-phase currents, said ground-return path including one of said windings, said circuits and one of said wires, over which one wire signal current is transmitted, said magnetizing current being of relatively small magnitude, but sufficient to excite said neutralizing transformer, whereby said induced voltages are substantially neutralized.

15. In a system of the type described, a pilot wire system comprising a plurality of wires between signal terminals, and means cooperating with said wire system, for reducing the effects, at said signal terminals, of extraneous voltages tending to produce currents in the same direction in said wires, said means comprising series-connected inductive and capacitive impedances for providing a ground path for said currents with series leading and lagging back-voltages due to flow of said currents through said impedances, and connection means for connecting said signal terminals to the first said means at points where the potential due to said current-flow is close to ground potential thereat.

16. In a system of the type described, signalling pilot wire systems comprising a plurality of pilot wires, each of said pilot wires comprising two sections, a neutralizing transformer having a plurality of windings, a plurality of capacitors, each capacitor having a winding associated therewith, means connecting each capacitor between one end of an associated one of said windings and ground, means connecting one of said two sections of each of said pilot wires to the other ends of said associated windings, one section for each winding, and connecting each of the other of said two sections of each of said pilot wires to intermediate connection points between the said ends of said associated windings.

17. A signalling channel of extended length for signalling between terminals, comprising wire-means for transmitting signalling currents, said wire-means consisting of a pair of signalling pilot wires; in combination with a neutralizing transformer having mutually coupled windings connected in the respective pilot wires, and means comprising circuit-means from said wire-means to ground, on a terminal side of said neutralizing transformer, for completing a circuit-path, including ground, for a relatively small magnetizing current for said neutralizing transformer, said circuit-path including an extended portion of said wire-means, whereby extraneously produced in-phase voltages in said signalling pilot wires are substantially neutralized in said windings.

18. A pilot wire system including terminals, pilot wires connecting one terminal to another, means for reducing the effect of longitudinal in-phase voltages in said pilot wires comprising a neutralizing transformer having a winding in each of said pilot-wires, the windings being coupled so as to offer, in effect, substantially lumped high impedance to current-flow caused by said longitudinal in-phase voltages whereby large back-voltages are produced in said inductive impedances and said current-flow is limited, and to offer reduced impedance to desired signal currents in said pilot wires, and a circuit-completing means for said current-flow, including a grounding means at each end of said pilot wires.

19. The combination with a pilot wire signalling system comprising spaced terminals, and means for transmitting signalling current between said terminals, comprising a pair of signal-conducting pilot wires, said pilot wires being subject to extraneously-produced voltages in the same direction therein; of means for reducing the effects of said extraneously-produced voltages, said means comprising a neutralizing transformer including a pair of mutually coupled windings, a winding of said neutralizing transformer being provided in each of said pilot wires, and means providing a circuit-path for magnetizing current-flow for said neutralizing transformer for producing back-voltages in each of said windings opposing the said extraneously-produced voltages, said circuit-path including ground and substantial portions of said pilot wires and windings.

EDWIN L. HARDER.